March 19, 1963 H. A. KHOURY 3,081,682

METHOD AND APPARATUS FOR OBTAINING AND MAINTAINING SPACING OF A TRANSDUCER

Filed June 28, 1961 4 Sheets-Sheet 1

INVENTOR
HENRI A. KHOURY

BY Joe L. Koerber
ATTORNEY

March 19, 1963 H. A. KHOURY 3,081,682

METHOD AND APPARATUS FOR OBTAINING AND MAINTAINING SPACING OF A TRANSDUCER

Filed June 28, 1961 4 Sheets-Sheet 2

March 19, 1963 H. A. KHOURY 3,081,682

METHOD AND APPARATUS FOR OBTAINING AND MAINTAINING SPACING OF A TRANSDUCER

Filed June 28, 1961 4 Sheets-Sheet 4

United States Patent Office 3,081,682
Patented Mar. 19, 1963

3,081,682

METHOD AND APPARATUS FOR OBTAINING AND MAINTAINING SPACING OF A TRANSDUCER

Henri A. Khoury, Yorktown Heights, N.Y., assignor to International Business Machines Corporation, New York, N.Y., a corporation of New York
Filed June 28, 1961, Ser. No. 120,404
11 Claims. (Cl. 95—45)

The present invention relates to hydrostatic air bearings and more particularly to apparatus for maintaining an air bearing surface a predetermined constant distance from a moving surface, within very close tolerances.

In the electronic computer art, data memories generally are of a magnetic type such as cores, drums, tapes and discs. The more common magnetic disc storage devices are of the well-known rigid disc type. Another example of the rigid disc store is a glass disc such as that shown in U.S. Patent 2,714,841 which carries recorded data in a developed photographic emulsion.

A recent development in magnetic disc storage is the substitution of a flexible disc for the rigid disc. The flexible disc may also be substituted for the rigid glass disc in photostore applications.

This substitution of a flexible disc for a rigid disc has the advantage of a significant reduction in cost, particularly in substituting for the glass disc, due primarily to the high cost of glass discs having sufficiently flat surfaces and which are optically pure. Also, film discs cut from photographic film stock generally have a more uniform emulsion than rigid discs, due to tooling methods. There are also the advantages of less weight, less bulk, and the unbreakable nature of the flexible discs.

However, on the debit side, there is the added problem of stabilizing the flexible disc and at the same time maintaining the necessary small and constant separation of the disc and transducer. With photographically stored data the stabilization problem is particularly critical due to the limited tolerances in the depth of focus of the lens.

Major considerations in the use of the flexible discs are the problems of flutter vibration, mechanical instability due to the flexible boundary, dynamic motion of the flexible disc, and the fact that the disc may have a 10 percent thickness variation around its periphery. Aerodynamic flutter must be controlled and the thickness variation must simultaneously be compensated for by servo control of the transducer spacing from the disc surface. In the use of a rigid disc, the problem of stabilizing the disc is not present but the thickness variation must be provided for.

Rigid magnetic discs are well known. Examples of hydrodynamic air bearing support of flexible discs are given in the January 1961 Proceedings of the IRE (pages 164–174), in U.S. Patent 2,950,353 issued August 23, 1960, and in French Patent 1,119,186 published June 15, 1956. The above references show full hydrodynamic support of a disc as well as support only at a selected point or sector.

The hydrodynamic bearing develops its load carrying capacity from the shearing action between the boundary layers adhering to the moving disc and to the stationary bearing, whereas the hydrostatic bearing is externally pressurized and its load carrying capacity depends only upon the external supply pressure.

French Patent 1,211,792, published March 18, 1960, relates to hydrostatic means for supporting a rotated flexible disc. In this latter patent, two toroidal members of porous material are supplied with pressure whereby air passes through the porous material to opposite sides of the rotated flexible disc to stabilize the disc in a plane between the two porous members. Magnetic reading and recording heads are imbedded in the porous members, for reading or recording data on the rotated disc. The two porous members are rigidly fixed relative to one another whereby the spacing therebetween is constant.

Copending application Serial Number 120,394 filed June 28, 1961, and assigned to the assignee of this invention discloses an air bearing sandwich consisting of a fixed air bearing element and a floating air bearing element for stabilizing a flexible disc and for maintaining a bearing surface of the floating element a constant distance from the adjacent surface of the disc.

The present invention stabilizes the flexible disc in the same manner, but the floating air bearing element is an improvement thereover. The improved floating air bearing element may also be used with a rigid type disc, without the fixed air bearing element, to provide a constant transducer to record medium spacing.

Accordingly, a primary object of this invention is to provide improved hydrostatic air bearing apparatus for maintaining a small but constant separation between a moving surface and a transducer element.

Another object of this invention is to provide a double chamber air bearing assembly for maintaining a transducer a small but constant distance from a moving surface.

A further object of this invention is to provide air bearing apparatus for following surface deviation of small magnitude.

Yet another object of this invention is to provide transducer apparatus which may be properly spaced relative to a record surface without regard to optimum point of operation on a load versus bearing pressure curve and which may then be shifted to the optimum point without altering the proper spacing.

A still further object is to provide a method of obtaining focus of a transducer using a double chamber air bearing element.

The foregoing and other objects, features and advantages of the invention will be apparent from the following more particular description of preferred embodiments of the invention, as illustrated in the accompanying drawings.

The environment for the present invention is a rotatable record disc which may have thickness variations of approximately 10 percent. The transducer spacing relative to the disc must be maintained at low speed, for example, one revolution per minute (r.p.m.) as well as at high speed, for example, 1400 r.p.m.

The invention is described as including a lens which is to be kept in focus with an emulsion on the lower side of the disc. However, it will be apparent that a magnetic head or other transducer could, within the scope of this invention, be substituted for the lens.

Two embodiments of the invention are illustrated, one wherein a stabilized flexible disc is used and the other in which a rigid disc is used. In both embodiments, a floating shoe is supported at the end of a lens arm and is preloaded by three pistons to a position closely adjacent to the emulsion side of a disc. The surface adjacent the disc consists of an inherently compensated air bearing which maintains a lubricating film of air between the shoe and the disc.

The lens arm upon which the shoe is mounted may be translated at extremely high speed (50 times the acceleration of gravity or higher) to position the shoe and an associated transducer element adjacent various record tracks arranged in an annulus on the disc.

The spacing between the floating shoe and the emulsion on the disc must be maintained substantially constant under all dynamic conditions, including high and low speed rotation of the disc with film flutter and with the support arm and shoe translated at high speed across the record annulus. The translation of the arm and shoe may be accomplished, for example, by an electromagnetic linear actuator of the voice coil type.

Measured results have disclosed stability within ±50 microinches which is well within the optical limits of the lens utilized in the described system. In other applications the required degree of stability is dependent upon the particular recording medium and transducer being used. The term constant or substantially constant as used hereinafter with respect to spacing between a disc surface and an air bearing surface is not intended to limit the spacing to any specific measurement or tolerance but is intended to denote a spacing within tolerances that, depending upon the recording medium and transducer being used, may be considered as constant.

Ambient air is used as a clean and inexpensive lubricant. The viscosity of the lubricating film of air remains substantially constant, maintaining a constant load carrying capacity. There is no physical contact between the disc and the air bearing. This not only preserves the disc from damage, but also maintains extremely low noise behavior.

Since the description of the floating shoe assembly is the same for both embodiments, only the embodiment utilizing a fixed air bearing element to back the flexible disc is described in detail.

Figure 8:
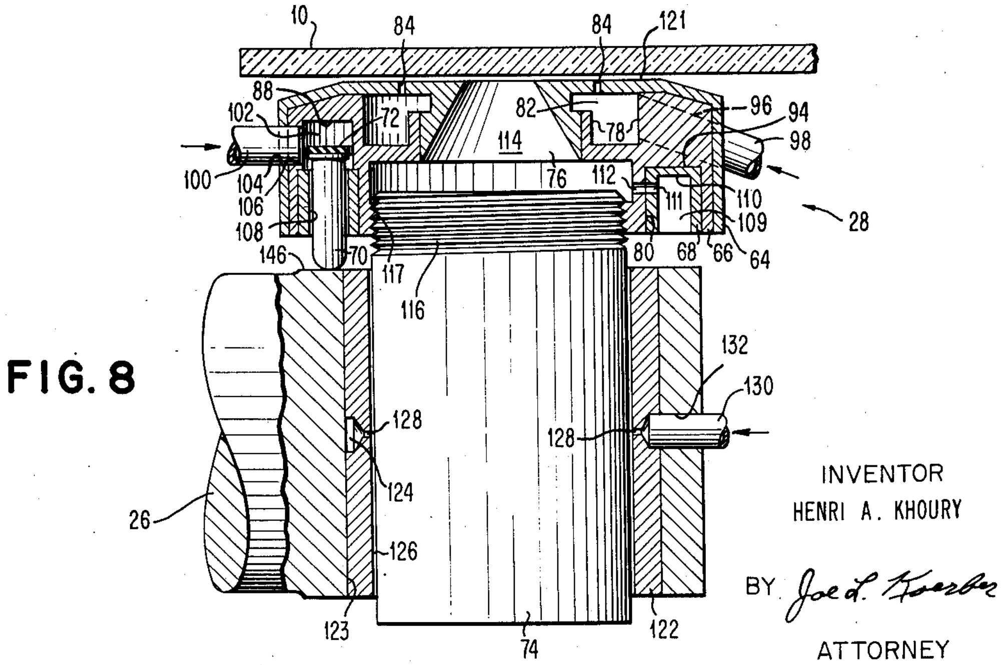
FIG. 8 is a sectional elevation of another embodiment of the invention.

It will be understood that the described floating shoe assembly may be used with a rigid, unbacked disc as shown in FIG. 8. Common parts in FIGS. 2 and 8 are given identical reference numbers.

Air from a first source is supplied to the fixed shoe and to one chamber of the floating shoe. Air escaping through nozzles in the opposed surfaces of the air bearings is directed against opposite sides of the disc with the nozzle pressures equal in both shoes, the flexible disc is maintained equidistant from the upper and lower shoes. When a thickened portion of the disc enters between the two shoes, the spaces between the shoes and the disc are restricted, causing a build-up of pressure which opposes a second pressure applied to a second chamber of the floating shoe. This build-up of pressure overrides the pressure applied to this second chamber and causes the floating shoe to move away from the disc. The disc then resumes its position equidistant between the two shoes.

Figure 1:
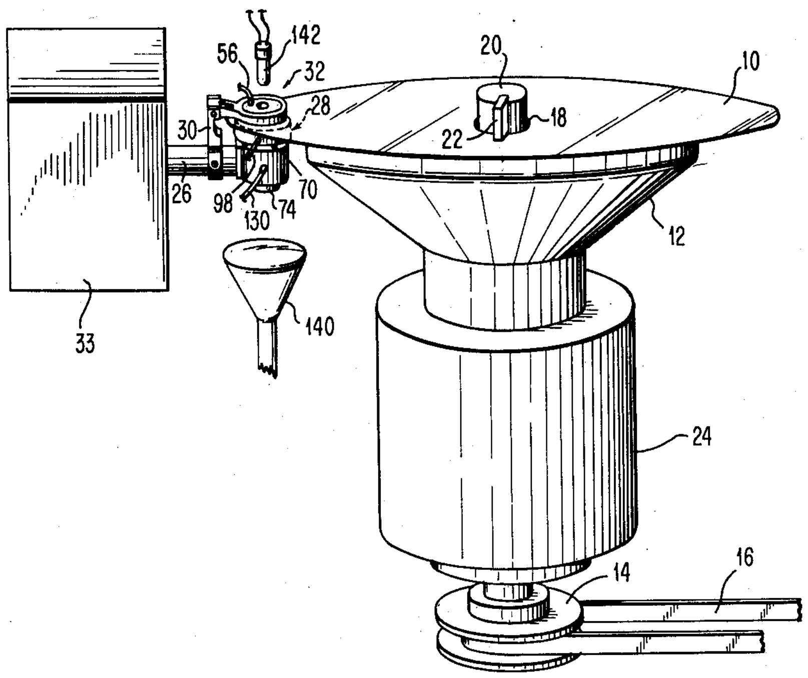
FIG. 1 is a perspective view of the flexible disc driving and stabilizing apparatus.

Referring to FIGURE 1, a flexible disc 10 is mounted on a rotatable turntable 12 which is rotated by means of a pulley 14 and a belt 16 from a motor not shown. The disc 10 has a central keyed aperture 18 which fits over a stud 20 having a keyed portion 22 to prevent rotation of the disc relative to the turntable. The turntable 12 is mounted for rotation in a bearing 24. An arm 26 adjacent the turntable supports a lower portion 28 of an air bearing sandwich. This lower portion is floating with respect to the disc 10 and is referred to hereinafter as the lower or floating or double chamber shoe. The arm 26 supports a bracket 30 which in turn supports an upper portion 32 of an air bearing sandwich, referred to also as the upper or fixed shoe. The arm 26 is axially movable by a voice coil type linear actuator schematically represented in FIG. 1 by block 33. Such a device is shown in U.S. Patent 2,118,862.

Figure 2:
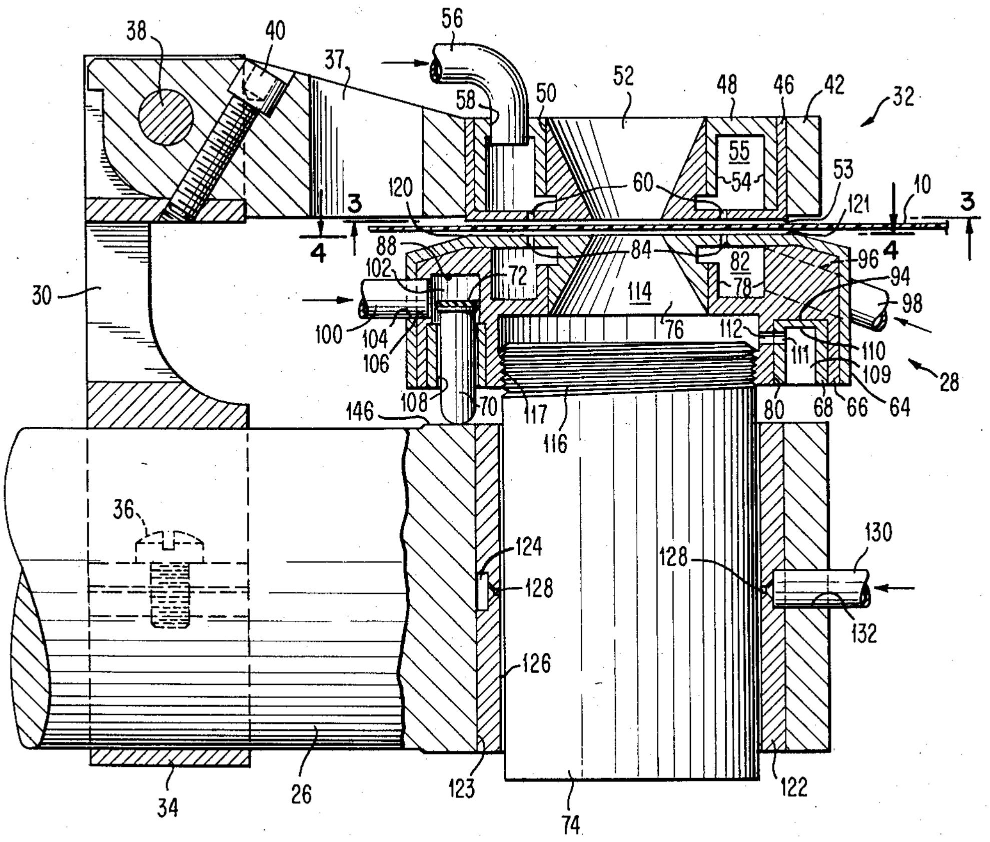
FIG. 2 is a sectional elevation of one embodiment of the air bearing apparatus.
Figure 3:
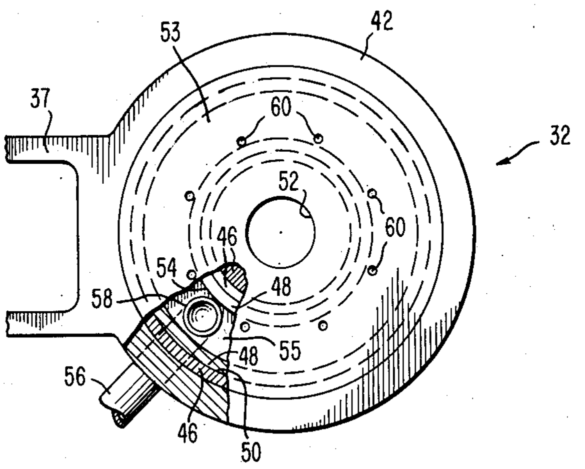
FIG. 3 is a plan view of the upper air bearing, partially broken away, taken along the line 3—3 in FIG. 2.

Referring to FIGURE 2, the bracket 30 is mounted on the arm 26 by means of a half ring element 34 and a pair of screws 36 (one shown). An arm 37 is pivotally mounted on the bracket 30 by a pivot pin 38 which permits pivoting of the upper shoe 32 away from the lower shoe 28, for example, during loading of a disc 10 therebetween. A set screw 40 is provided for rigidly fixing the arm 37 in the position shown. As best shown in FIGURE 3, the arm 37 terminates in a circular portion 42 within which the upper shoe 32 is fixedly mounted.

Referring to FIGURES 2 and 3, the upper shoe 32, exclusive of the ring 42, consists of two elements 46 and 48. FIG. 3 is partially broken away to better illustrate the construction. The outer element 46 is a circular member having a circular channel defined by the side walls 50 extending completely around and having a bevelled opening defined by the side wall 52 extending through the center of the member 46. The bevelled opening 52 extends from a smaller diameter at the lower surface 53 of the element 46 to a larger diameter at the upper surface.

The element 48 is an inverted circular member having an open circular channel defined by the side walls 54 extending completely around. The element 48 is force fitted into the member 46 to form an enclosed internal channel designated 55. An air supply hose 56 is connected to the internal channel 55 through an aperture 58 in the upper surface of the element 48. Eight orifices 60 arranged in a circle and penetrating the lower surface 53 of the channel element 46 connect the internal channel 55 to the atmosphere. Each orifice 60 is .006 inch in diameter. Air supplied through the air hose 56 flows out through the orifices 60 which are perpendicular to the surfaces 53 and exerts a pressure on the top side of the disc 10. The air bearing surface 53 is approximately .625 inch in diameter.

Figure 4:
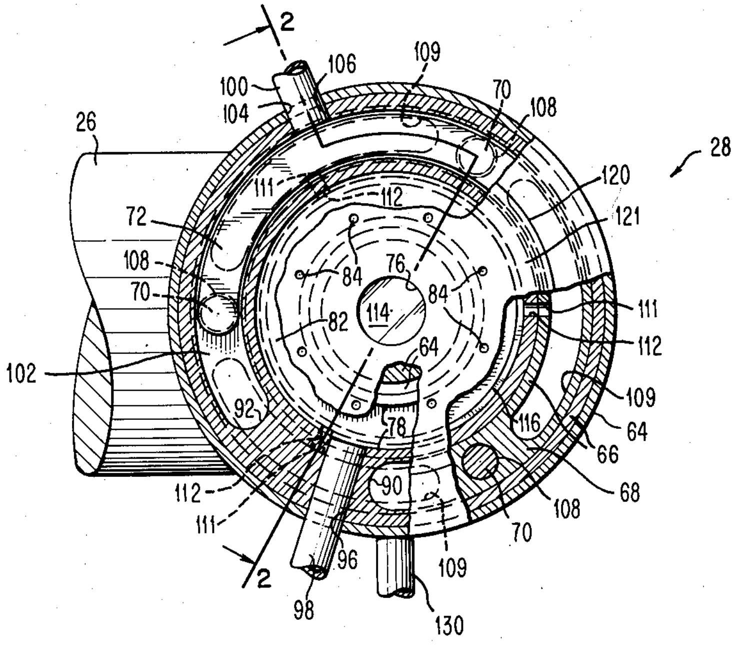
FIG. 4 is a plan view of the lower air bearing, partially broken away, taken along the line 4—4 in FIG. 2.

Referring to FIGS. 2 and 4, the lower shoe assembly 28 consists essentially of three circular channel elements 64, 66 and 68, three pistons 70, a rubber element 72 and a lens assembly 74. FIGURE 4 is broken away at two different levels to better illustrate the structure. The channel element 64 includes a bevelled hole 76 similar to the bevelled hole 52 in the upper shoe 32 except that it is inverted. The channel element 66 has an upper circular channel 78 extending completely around and a lower channel 80 extending only part way around, as described hereinafter. The element 66 is force-fitted into the channel of element 64 to form an internal closed channel designated 82. This channel 82 is vented to the atmosphere through 8 orifices 84 arranged in a circle similar to the orifices 60 of the upper shoe. These orifices similarly are .006 inch in diameter. The channel element 68 is force-fitted into the lower channel 80 of the element 66.

The channel 80 formed in the element 66 extends to a depth indicated by the line 88 in FIGURE 2, from the point 90 (FIG. 4) clockwise to the point 92. For the remainder of the distance, the channel 80 extends only to the depth of the line 94 in FIGURE 2. The purpose of not milling the channel 80 to the full depth between the points 90 and 92 in a clockwise direction is to permit boring of a hole 96 through which an air tube 98 is connected to provide air pressure to the internal channel 82.

An air supply hose 100 is connected to the internal closed channel 102, formed by the member 68 force-fitted into the channel 80, through holes 104 and 106 reamed in the channel members 64 and 66 respectively. Holes 108 spaced at 120° intervals extend through the channel element 68 to provide openings into the channel 102. The three pistons 70, which are .074 inch in diameter, are inserted in these three holes 108, the upper flanged ends thereof being positioned in the closed channel 102. The rubber element 72 forming a partial circle co-extensive with the channel 80 is glued to the tops of the three pistons 70 to prevent rotation of the pistons and consequent noise and vibration. Air pressure supplied through the tube 100 bears on the top of the rubber element 72 and consequently exerts a force on the top of the pistons 70.

Between the holes 108, three sectors 109 are milled out of the element 68 to a depth indicated by the line 110 in FIG. 2 to reduce the weight. Three holes 111 bored in the inner wall of channel member 68 align with three holes 112 bored in the inner wall of channel member 66. These three pairs of holes vent the space 114 formed by the bevelled hole 76 and the space above the lens 74 through the milled out sectors 109, to the atmosphere.

The upper surface of the shoe 28 is bevelled from a point 120 to provide a bearing surface co-extensive with the bearing surface of the upper shoe.

The lens assembly 74 is fastened to the channel element 66 by threads 116 and 117. The lens assembly 74 and consequently the lower shoe assembly 28 which is fixed thereto is supported on the arm 26 by means of an air bearing 122. A circular bore 123 in the end of the arm 26 supports the air bearing ring 122 which is force-fitted in the bore 123. The ring 122 includes a channel which, in the force-fit condition of the member 122 in the bore 123, forms a closed channel 124. This closed channel is connected to the inner surface 126 of the air bearing by eight orifices 128. Air is supplied to the channel 124 through a supply hose 130 and an aperture 132 in the bore 122. Air escaping from the channel 124 through the orifices 128 exerts equal pressure from all directions on the lens assembly 74 thereby maintaining this assembly in a central position within the air bearing. The essentially frictionless bearing permits up and down movement of the lens assembly 74 in response to variations in the pressure on the bearing surface 121 and the pistons 70.

Referring to FIGS. 1 and 2, light from a source 140, such as the beam of a cathode ray tube (CRT) is directed at the lower surface of the lens assembly 74 and is focused by the lens, through the apertures 52 and 76 upon photographically recorded data on the disc 10. The light beam passes through non-opaque portions of the data to a detector unit 142 such as a photomultiplier tube (PMT).

Figure 5:
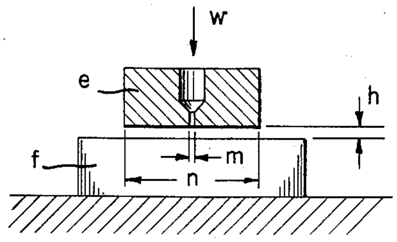
FIG. 5 shows a loaded air nozzle discharging onto a fixed plate.
Figure 6:
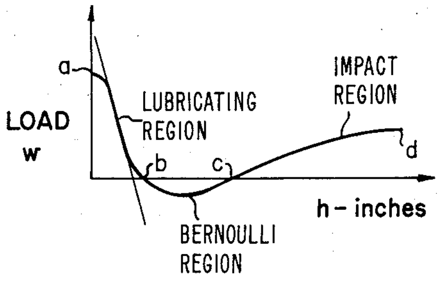
FIG. 6 is a graph showing the general load vs. spacing relationship of a thrust air bearing such as that shown in FIG. 5.

Using a device consisting of a loaded nozzle *e* discharging onto a plate *f*, as shown in FIG. 5, a curve of load $w$ versus air film thickness $h$ may be plotted for a given nozzle diameter $m$ and air bearing area $n$. Referring to FIGURE 6, this curve may be divided into three regions as follows: the lubricating region, *a—b*; the Bernoulli region, *b—c*; the impact region, *c—d*. In the Bernoulli region, a region of negative load, the plate is attracted to the nozzle. In the impact region the plate is forced away from the nozzle.

Figure 7:
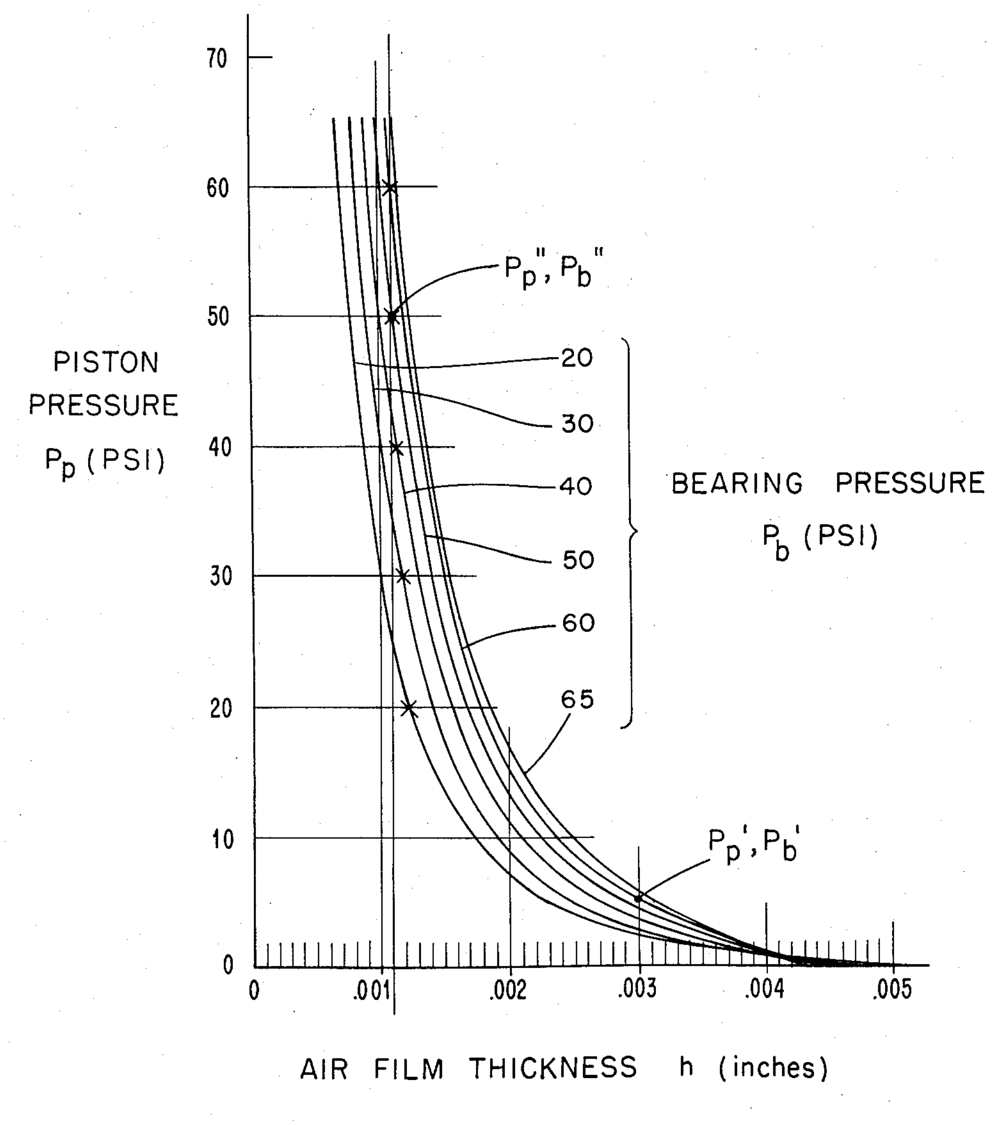
FIG. 7 is a load vs. spacing diagram of the lubricating region of the curve of FIG. 6 for various bearing pressures.

Referring to FIGURE 7, a number of curves are shown which represent, for the disclosed apparatus, the lubrication region of the general curve shown in FIGURE 6. The horizontal axis represents film thickness $h$ in inches whereas the vertical axis represents a load $w$ in grams. This load in grams is also referred to hereinafter as piston pressure $P_p$ and is the pressure applied to the tops of the pistons 70. Each of the curves in FIGURE 7 represents a particular bearing pressure $P_b$ in pounds per sq. inch (p.s.i.) applied through the orifices 60 and 84 to the disc 10, and shows how the air film thickness increases as the load decreases. It is noted that all of the curves in FIGURE 7 have a substantially linear portion at higher load values but deviate rapidly from this linear status as $P_p$ approaches zero.

The curve data for FIGURE 7 is shown in the table below.

| $P_p$ (p.s.i.) | $P_b$ (p.s.i.) | | | | | |
|---|---|---|---|---|---|---|
| | 20 | 30 | 40 | 50 | 60 | 65 |
| 0 | .00510 | .00480 | .00460 | .00450 | .00450 | .00435 |
| 5 | .00230 | .00250 | .00273 | .00290 | .00303 | .00312 |
| 10 | .00175 | .00191 | .00210 | .00226 | .00237 | .00251 |
| 15 | .00140 | .00160 | .00178 | .00189 | .00200 | .00210 |
| 20 | .00120 | .00140 | .00154 | .00168 | .00178 | .00185 |
| 25 | .00111 | .00129 | .00140 | .00150 | .00161 | .00167 |
| 30 | .00100 | .00118 | .00130 | .00140 | .00150 | .00152 |
| 35 | .00094 | .00109 | .00121 | .00131 | .00140 | .00142 |
| 40 | .00089 | .00101 | .00112 | .00123 | .00132 | .00137 |
| 45 | .00082 | .00095 | .00109 | .00119 | .00127 | .00130 |
| 50 | .00078 | .00090 | .00101 | .00110 | .00120 | .00123 |
| 55 | .00073 | .00083 | .00095 | .00107 | .00113 | .00119 |
| 60 | .00070 | .00080 | .00092 | .00101 | .00110 | .00118 |
| 65 | .00066 | .00078 | .00089 | .00098 | .00108 | .00110 |

NOTE.—Air film thickness $h$ (inches).

OPERATION

With pressure applied to the input hoses 56 and 98, air flows into the internal channels 55 and 82, through the apertures 60 and 84 against both faces of the film disc 10, outwardly to the outer edges of the air bearing shoes 32 and 28 and inwardly to the bevelled apertures 52 and 76. Air flows through the aperture 52 to atmosphere and from the aperture 76 through the apertures 111 and 112 and the milled out sections 110 to the atmosphere. In thus flowing, the air exerts stabilizing forces on the film disc at the point it passes between the air bearing shoes. If the supply pressures at 56 and 98 are equal, the film disc 10 is maintained substantially equidistant from the shoes 32 and 28. If the pressures are unequal, the disc is stabilized in a plane closer to the shoe having the lower pressure.

It is preferable to have the pressures equal so that faltering or failure of the air supply pressure will have the least effect on the stability of the disc. For this reason, it is desirable to have a common supply for full shoes.

The air supplied from a second source through the hose 100 bears through the rubber element 72 upon the tops of the three pistons 70. These three pistons bear on the top surface 146 of the arm 26. This pressure applied to the tops of the pistons tends to force the pistons downwardly, but since the pistons rest upon the surface 146 of the arm 26, the floating shoe assembly 28 is forced upwardly to a point at which there is a balance between the pressure applied to the tops of the pistons and the pressure exerted on the top surface 121 of the shoe 28 by the air escaping between the shoe and the disc 10. The shoe assembly 28 will remain in this balanced position until a variation in the thickness of the film disc effects an unbalanced condition.

Thus, when a thicker or a thinner portion of the disc 10 moves between the upper shoe 32 and the lower shoe assembly 28 the space $h_1$ between the shoe 32 and the disc 10 and the space $h_2$ between the disc 10 and the shoe assembly 28 will be maintained by appropriate shifting of the assembly 28 and the disc 10.

Movement of the disc 10 relative to the shoe 32 is dependent upon whether the upper surface of the disc diverges from the plane of rotation, whereas, any variation in thickness of the disc, whether on the upper, lower or both sides of the disc, causes a shifting of the floating shoe assembly 28. Where a rigid disc is used, as in FIG. 8, there would be no shifting of the disc but only of the floating shoe.

The distance $h_1$ between the fixed shoe 32 and the disc 10 will be maintained with somewhat less precision than the distance $h_2$ between the disc 10 and the shoe assembly 28, since maintaining of the spacing $h_1$ is dependent only upon disc 10 responding to the changes in pressure and moving relative to the shoe 32.

On the other hand, the spacing $h_2$ between the disc 10 and the floating shoe assembly 28 is not dependent solely upon response of the disc 10 to pressure changes but is dependent also upon the high tracking response of the very light weight (.025 lb.) shoe assembly 28 to differences in piston pressure and bearing pressure. The assembly 28 may have a vertical tracking response in the order of 40 to 50 times the acceleration of gravity, depending upon the applied pressures.

Since the lens is carried by the floating shoe assembly, the lesser precision in maintaining the space $h_1$ is not critical.

A thickened portion of the disc moving between the air bearing surfaces 53 and 121 reduces the spacing between the disc and the bearing surfaces thus constricting the escape passages and causing a build-up in pressure between the disc 10 and the surfaces 53 and 121. This pressure on the shoe assembly 28, surface 121, exceeds the internal pressure on the pistons 70 and thus moves the shoe assembly 28 downwardly. When the original spacing between the disc 10 and the shoe 28 is achieved, the pressure on the surface 121 on the tops of the pistons 70 is again balanced.

Similarly, when a thinner portion of the film disc 10 moves between the shoes 32 and 28, the spacing between the disc 10 and the surfaces of the shoes increases. The pressure on the surface 121 at this point is then lower than the pressure on the tops of the pistons 70, whereby the pistons 70 force the shoe assembly 28 upwardly until the spacing and pressure are again balanced. As described hereinbefore this up and down movement of the shoe assembly 28 is substantially frictionless due to the air bearing 122 in which the assembly is mounted.

*Focal Adjustment*

As described hereinbefore, an air bearing should be designed to operate at the maximum slope of the lubricating region for maximum stiffness. It also is preferable to operate with the bearing pressure $P_b$ applied to hose 98 equal to the piston pressure $P_p$ applied to the hose 100, such that any faltering in the air supply pressure will be equally effective on the bearing pressure and on the piston pressure and thus will have a negligible effect on the air film thickness $h$.

Referring to the graph in FIGURE 7, and the preceding chart of corresponding values, it is apparent that the film thickness or gap $h$ may be varied for a given piston pressure $P_p$ by merely changing the bearing pressure $P_b$. As $P_b$ is changed, the point of operation shifts from one of the curves in FIGURE 7 to another curve. For example, if the piston pressure $P_p$ is fixed at 60 pounds per square inch (p.s.i.), and the bearing pressure $P_b$ is changed successively from 60 to 50 to 40 to 30 to 20, the air film thickness (see chart) changes from .00110 to .00101 to .00092 to .00080 to .00070 inch, or a total of .00040 inch which is greater than the depth of focus (approximately .0003 inch) of the lens described. This method allows changing of the gap for focusing without affecting the stiffness of the air bearing.

Similarly, the air film thickness $h$ may be changed by holding the bearing pressure $P_b$ constant and changing the piston pressure $P_p$. Raising the piston pressure causes the operation point to move upwardly on the selected bearing pressure curve, decreasing the air film thickness and increasing the air bearing stiffness. Lowering the piston pressure causes the operation point to move downwardly on the selected curve, increasing the air film thickness and decreasing the bearing stiffness.

For example, with pressure $P_b$ fixed at 50 p.s.i., $P_p$ is changed successively from 60 to 50 to 40 to 30 to 20, the air film thickness changes from .00101 to .00110 to .00123 to .00140 to .00168 inch or a total of .00067 inch. It is apparent that, due to the non-linear nature of the lower regions of the curves, a 10 p.s.i. change in $P_p$ from 20 p.s.i. to 10 p.s.i. effects a change of .00058 inch in air film thickness, or nearly the same effect as a 40 p.s.i. change in the higher, more linear region. A 5 p.s.i. change in $P_p$ from 10 p.s.i. to 5 p.s.i. effects .00064 inch change in air film thickness.

Thus, it is apparent that a preferred dynamic operating point of the air bearing is in the linear portion, due both to the stiffer bearing obtained and the fact that changes in pressure have the least effect on air film thickness.

Referring to the marked points ($x$) in FIGURE 7 and the chart of values, it is noted that concurrent variation of $P_p$ and $P_b$ from 60 p.s.i. to 50 p.s.i. to 40 p.s.i. to 30 p.s.i. to 20 p.s.i. results in only .0001 inch of variation in air film thickness. This variation is only one-third the depth of focus. Thus, it is apparent that air film thickness is, for practical purposes, independent of pressure varations when $P_p$ and $P_b$ have a common pressure supply.

The following procedure permits (1) optimum focusing of the lens; (2) adjustment of the floating shoe assembly to a preferred dynamic operating point high on the curve to obtain a stiff air bearing and consequently minimize the variation from the optimum focal gap; (3) selecting a dynamic operating point where $P_p=P_b$ such that a large pressure drop has a negligible effect focus.

First, the lens is manually adjusted by means of the threads 116 and 117 in accordance with the lens manufacturers data regarding the working distance of the lens and the pitch of the threads. For example, the lens may have a working distance of .250 inch and the thread pitch may be 80 per inch whereby one revolution of the lens changes the vertical position of the lens of .0125 inch. With a depth of focus of .0003 inch, and with a film thickness span of approximately .004 inch from a point high on the curve to a point low on the curve, it is necessary to obtain an initial approximate focus by manual positioning of the lens so that the optimum focal positions falls within the range of the curves in FIG. 7.

After the approximate focus is manually obtained, either $P_p$ or $P_b$ is fixed and the other pressure is varied until the optimum focus is observed. This observation may be made by optically projecting images from the disc at different values of the variable pressure and then observing, by microscopic inspection of the projected images, which pressure provided the optimum focus.

For example, set $P_b$ at a given value which we will call $P_b'$ and vary $P_p$ until focus is achieved. This pressure is designated $P_p'$. Note the air film thickness $h$ at the point $P_p'$—$P_b'$ on the curve.

Assume for example that the bearing pressure $P_b'$ is fixed at 60 lbs. per sq. inch (p.s.i.) and the piston pressure is varied until focus is achieved, for example at $P_p'=5$ p.s.i. At this point the air film thickness is approximately .00303 inch. Focus has been achieved but it is at a point low on the $P_b$ curve. $P_b'$ and $P_p'$ are unequal and, in addition, it is at a point at which a small variation in piston pressure will cause a change in air film thickness which is large relative to the depth of focus of the lens.

To provide stable operation, the operating point must be shifted to the linear portion of the curve. Assume, for example, that it is desired to shift the operating point such that $P_p''=P_b''=50$ p.s.i. Select the point $P_p''$, $P_b''$ on the 50 p.s.i. curve. Draw a vertical line through this point or select the point from the chart of values. The vertical line intersects the horizontal axis at approximately .00110 inch. The difference between the latter intersection point and the previously obtained focus point $P_p'$, $P_b'$ is approximately .00193 inch (.00303–.00110).

Manually rotate the lens assembly 74 in the threads 117 approximately 55.6° to shift it downwardly .00193 inch. Apply 50 p.s.i. pressure to both hoses 98 and 100. The lens is now in optimum focus and the bearing is operating at a point high on the $P_b=50$ p.s.i. curve. Now, if a common pressure supply is used for $P_b$ and $P_p$, a pressure variation will not cause the lens to move out of focus.

Since force equals weight times acceleration divided by the acceleration of gravity $$F=\frac{w}{g}a$$

or $$a=\frac{F}{w}g$$

where F=piston preload—weight of shoe, the weight of the floating shoe must be kept as low as possible to permit high tracking response to disc thickness variations. For example based on a piston preload of approximately one pound and a floating shoe assembly weight of .025 pound.

$$a=\left(\frac{1-.025}{.025}\right)g=39g$$

Based on a tracking acceleration of 39 g., the response time to track .001 inch of disc face variation is:

$$t=\sqrt{\frac{2s}{a}} \text{ where } s=\text{the variation in inches}$$

$$t=\sqrt{\frac{2(.001)}{39(386)}}=364 \text{ microseconds}$$

While the invention has been particularly shown and described with reference to preferred embodiments thereof, it will be understood by those skilled in the art that various changes in form and details may be made therein without departing from the spirit and scope of the invention.

What is claimed is:

1. Apparatus for supporting an element a predetermined distance from a substantially plane surface comprising, in combination, a first member having a substantially plane surface, a support member mounted adjacent to said surface, an air bearing member having a first and a second air chamber, means mounting said air bearing member on said support member for movement along an axis perpendicular to the plane of said surface, said air bearing member having a plane surface parallel to said plane surface of said first member, means for effecting relative motion between said first member and said air bearing member in a plane parallel to said surfaces, means for supplying pressurized air to said first chamber, means directing air from said first chamber against the first mentioned plane surface to provide a hydrostatic air bearing, a plurality of pistons bearing upon said support member and extending into said second chamber, and means for applying pressurized air to said pistons via said second chamber.

2. Apparatus for supporting an element a predetermined distance from a substantially plane surface comprising, in combination, a first member having a substantially plane surface, a support member mounted adjacent to said surface, an air bearing member having a first and a second air chamber, air bearing means mounting said air bearing member on said support member for movement along an axis perpendicular to the plane of said surface, said air bearing member having a plane surface parallel to said plane surface of said first member, means for effecting relative motion between said first member and said air bearing member in a plane parallel to said surfaces, means for supplying pressurized air to said first chamber; a plurality of orifices in the second mentioned plane surface for directing air from said first chamber against the first mentioned plane surface to provide a hydrostatic air bearing, a plurality of pistons bearing upon said support member and extending into said second chamber, and means for applying pressurized air to said pistons via said second chamber.

3. The apparatus of claim 2 wherein said orifices are arranged in a circle concentric with said second mentioned plane surface.

4. The apparatus of claim 2 wherein said orifices are perpendicular to the second mentioned plane surface.

5. Apparatus for supporting an element a predetermined distance from a substantially plane surface comprising, in combination, a circular disc having a substantially plane surface, a support member mounted adjacent to said surface, an air bearing member having a plane circular air bearing surface parallel to said plane surface of said disc and having a first and a second air chamber, means mounting said air bearing member on said support member for movement along an axis perpendicular to the plane of said bearing surface, means for rotating said disc in a plane parallel to said bearing surface, means for supplying pressurized air to said first chamber, a plurality of orifices in said circular air bearing surface for directing air from said first chamber against the first mentioned plane surface to provide a hydrostatic air bearing, at least three pistons bearing upon said support member and extending into said second chamber, and means for applying pressurized air to said pistons via said second chamber.

6. Apparatus for supporting an element a predetermined distance from a substantially plane surface comprising, in combination, a first member having a substantially plane surface, a support member mounted adjacent to said surface, an air bearing member having an air bearing surface parallel to said plane surface of said first member and having a first and a second air chamber, means mounting said air bearing member on said support member for movement along an axis perpendicular to the plane of said bearing surface, means for rotating said first member in a plane parallel to said surfaces, means for moving said support member in an axial direction parallel to the plane of said bearing surface, means for applying pressurized air to said first chamber; means directing air from said first chamber against the first mentioned plane surface to provide a hydrostatic air bearing, a plurality of pistons bearing upon said support member and extending into said second chamber, and means for applying pressurized air to said pistons via said second chamber.

7. A method of obtaining focus of a lens relative to an adjacent surface comprising the steps of mounting a lens carrying hydrostatic air bearing element in a support member adjacent to said surface, said bearing element having a first air chamber discharging onto said surface and a second air chamber containing pistons bearing upon said support member, said bearing element being movable in said support along an axis perpendicular to said surface, applying a fixed air pressure to one of said chambers, applying pressure to the other said chamber, and changing the latter pressure until said lens is moved into focus.

8. A method of obtaining focus of a lens relative to an adjacent surface comprising the steps of mounting a lens carrying hydrostatic air bearing element in a support member adjacent to said surface, said bearing element having a first air chamber discharging onto said surface and a second air chamber containing pistons bearing upon said support member, and being movable in said support member along an axis perpendicular to said surface, applying a selected constant air pressure to said first air chamber, applying air pressure to said second air chamber, and changing the pressure applied to said second air chamber until said lens is moved into focus.

9. A method of obtaining focus of a lens relative to an adjacent surface comprising the steps of mounting a lens carrying hydrostatic air bearing element in a support member adjacent to said surface, said bearing element having a first air chamber discharging onto said surface and a second air chamber containing pistons bearing upon said support member, and being movable in said support member along an axis perpendicular to said surface, applying a selected constant air pressure to said second air chamber, applying air pressure to said first air chamber, and changing the pressure applied to said first air chamber until said lens is moved into focus.

10. A method of obtaining focus of a lens relative to an adjacent surface comprising the steps of mounting a lens carrying hydrostatic air bearing element in a support member adjacent to said surface, said bearing element having a first air chamber containing pistons bearing upon said support member and a second air chamber discharging onto said surface to provide an air film between said surface and said element the thickness of which is variable by relative changes in pressure applied to said chambers, said bearing element being movable in said support member along an axis perpendicular to said surface, in accordance with said air film thickness, applying a selected constant pressure to one said chamber, applying air pressure to the other said chamber, and changing the pressure applied to the said other chamber to change said air film thickness until said lens is moved into focus.

11. A method of obtaining focus of a lens relative to an adjacent surface and a selected air bearing stiffness with equality of two controlling air pressures comprising the steps of: mounting a lens carrying air bearing element in a support member adjacent to said surface, said bearing element having a first air chamber containing pistons bearing upon said support member and a second air chamber discharging onto said surface to provide an air film between said surface and said bearing element the thickness of which is variable by relative changes in pressure applied to said chambers, said bearing element being movable in said support member, along an axis perpendicular to said surface, in accordance with said air film thickness, applying a selected constant pressure P to one said chamber, applying air pressure to the other said chamber, changing the pressure applied to said other chamber to change said air film thickness until a first focus point F is achieved at a pressure Q, selecting a desired point P′, Q′ on a graph representative of pressure applied to said other chamber versus air film thickness with pressure applied to said one chamber constant, where P′ equals Q′, determining from said graph the thickness differences in said film at said point F and at said point Q′, moving said lens said determined distance along said axis, and applying the pressure P′=Q′ to both said chambers.

References Cited in the file of this patent

FOREIGN PATENTS

| | | |
|---|---|---|
| 1,119,186 | France | Apr. 3, 1956 |
| 1,211,792 | France | Oct. 12, 1959 |